United States Patent

[11] 3,573,671

| [72] | Inventors | Robert A. Johnson<br>Tustin;<br>Roger J. Teske, Santa Ana, Calif. |
|---|---|---|
| [21] | Appl. No. | 776,496 |
| [22] | Filed | Nov. 18, 1968 |
| [45] | Patented | Apr. 6, 1971 |
| [73] | Assignee | Collins Radio Company<br>Cedar Rapids, Iowa |

[54] LATTICE-TYPE FILTERS EMPLOYING MECHANICAL RESONATORS HAVING A MULTIPLICITY OF POLES AND ZEROS
13 Claims, 34 Drawing Figs.

[52] U.S. Cl. ................................................. 333/72, 333/77
[51] Int. Cl. ................................................. H03h 9/32, H03h 9/26
[50] Field of Search ......................................... 333/30, 71, 72, 77

[56] References Cited
UNITED STATES PATENTS

| 2,980,872 | 4/1961 | Storch | 333/72 |
| 3,135,933 | 6/1964 | Johnson | 333/72X |
| 3,334,307 | 8/1967 | Blum | 333/72X |
| 3,349,347 | 10/1967 | Sauerland | 333/72 |
| 3,439,295 | 4/1969 | Bise | 333/71 |
| 3,440,572 | 4/1969 | Bise | 333/72X |
| 3,440,574 | 4/1969 | Johnson et al. | 333/72 |
| 3,488,608 | 1/1970 | Johnson | 333/71 |

Primary Examiner—Herman Karl Saalbach
Assistant Examiner—Saxfield Chatmon, Jr.
Attorneys—Robert J. Crawford and Henry K. Woodward ABSTRACT: A lattice-type filter with the series arm and cross-arm impedances comprised of a multiresonant mechanical structure having a plurality of arrangeable poles and zeros. The multiresonant structure can comprise a plurality of discs with their axes lying along a common line. Coupling wires secured to the disc perimeters hold them in place and transmit energy. The input means is a coil wound on a magnetostrictive rod secured to an end disc.

Patented April 6, 1971

INVENTORS.
ROBERT A. JOHNSON
ROGER J. TESKE

BY Donald W. Rullion
ATTORNEY

INVENTORS.
ROBERT A. JOHNSON
ROGER J. TESKE

BY Donald W. Phillips
ATTORNEY

INVENTORS.
ROBERT A. JOHNSON
ROGER J. TESKE
BY Donald W. Phillips
ATTORNEY

Patented April 6, 1971

INVENTORS.
ROBERT A. JOHNSON
ROGER J. TESKE

BY Donald W. Phillips
ATTORNEY

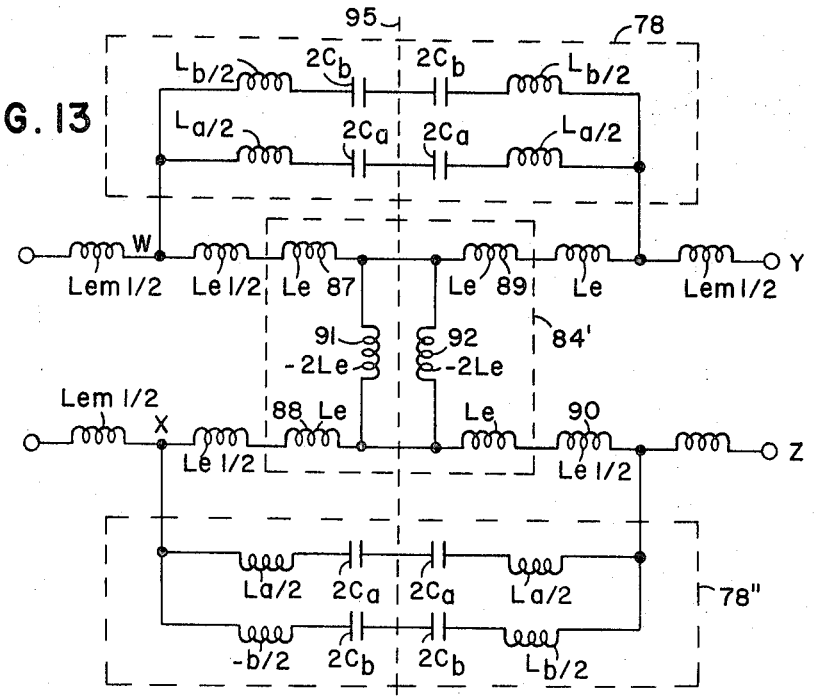
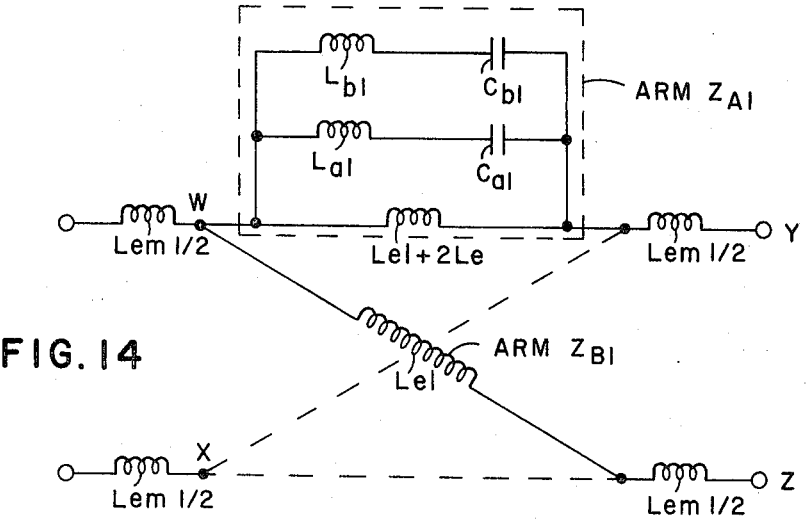
INVENTORS.
ROBERT A. JOHNSON
ROGER J. TESKE
BY Donald W. Phillips
ATTORNEY Patented April 6, 1971  3,573,671

INVENTORS.
ROBERT A. JOHNSON
ROGER J. TESKE
BY Donald W. Phillips
ATTORNEY

Patented April 6, 1971

INVENTORS.
ROBERT A. JOHNSON
ROGER J. TESKE

BY Donald W. Phillips

ATTORNEY

Patented April 6, 1971

INVENTORS.
ROBERT A. JOHNSON
ROGER J. TESKE

BY Donald W. Phillips
ATTORNEY

Patented April 6, 1971 3,573,671

INVENTORS.
ROBERT A. JOHNSON
ROGER J. TESKE

BY Donald W. Phillips
ATTORNEY 3,573,671

LATTICE-TYPE FILTERS EMPLOYING MECHANICAL RESONATORS HAVING A MULTIPLICITY OF POLES AND ZEROS

This invention relates generally to lattice-type filters, and more specifically to lattice-type filters employing mechanical-type impedances as the series arm and crossarm impedances.

As in the case of all filters, the lattice-type filter employs impedances which have poles and zeros arranged in a particular manner to pass selected bands of frequencies. The number of poles and zeros in the impedances of the filter can be stated generally to determine the transfer function of the filter, and more specifically, the center frequency, the bandwidth and the ripple therein.

It can be stated generally that as the number of poles and zeros in a filter increases, so does the selectivity. Thus, it is advantageous to increase the number of poles and zeros in a filter and specifically in a lattice-type filter.

Traditionally, the series arm and crossarm impedances of lattice-type networks are comprised of lumped constants such as L's and C's in the form of perhaps series circuits connected in parallel or parallel circuits in series in each of the lattice arms. Alternatively, the impedances may be formed by a parallel connection of crystal resonators.

Another type filter that has been developed is a mechanical-type filter comprised of a plurality of discs spaced apart, one from the other, in a stacked arrangement with the axes thereof lying along a common line. Coupling wires are secured along perimeters of the discs to hold the discs in the relation described above. A transducer means, such as a magnetostrictive rod, is secured to each of the ends and is excited by a coil wound thereon. The signal is supplied through one end disc and then transmitted through the coupling wires to successive discs. At the other end of the filter, a second transducer rod with a winding thereon is employed to detect the filtered signal. Such a mechanical filter is well developed in the art and has a plurality of poles and zeros which can be positioned to provide a relatively high selectivity characteristic.

A third type filter that has recently been developed employs a monolithic crystal plate having a plurality of pairs of electrodes formed thereon. Each pair of electrodes and the portion of the crystal therebetween forms a resonator which is mechanically and electrically coupled to the adjacent resonators which in turn are similarly formed. Input and output means comprise a first and a second pair of said electrodes, respectively.

It is a primary object of the present invention to combine modifications of the disc-wire mechanical filter or the monolithic crystal filter described above, in a lattice-type matrix, as the series and crossarm impedances thereof.

A second aim of the invention is to provide a lattice-type filter employing a disc-wire structure in each of its series and crossarm impedances, with each of said disc-wire structures having a plurality of poles and zeros.

A third purpose of the invention is to provide a lattice-type filter in which each of the series arm impedances and each of the crossarm impedances is comprised of a disc-wire, mechanical-type impedance having a plurality of poles and zeros arrangeable to provide a plurality of transfer functions having a wide range of characteristics for meeting specific applications.

A fourth purpose of the invention is a relatively inexpensive and reliable lattice-type filter in which each of the series and crossarm impedances contains a plurality of positionable poles and zeros.

A fifth purpose of the invention is the improvement of lattice-type filter networks generally.

In accordance with the invention, there is provided a lattice-type circuit in which the series and crossarm impedances each consist of a disc-wire section, each of which in turn is comprised of a plurality of discs arranged substantially parallel to each other with their axes lying along a common line, and being held in such a position by coupling wires positioned along the perimeters thereof and secured thereto. Magnetostrictive transducer means, comprising a rod secured to an end disc and having a winding wound thereon, is employed to couple the said disc-wire arrangement into the lattice-type circuit. There is no transducer rod on the other end of the disc-wire section. By appropriate sizing of the discs, coupling wires, and the transducer means, the poles and zeros of the disc-wire structures can be arranged to provide frequency response characteristics not obtainable with other structures.

In accordance with another form of the invention, the poles and zeros of the disc-wire structures comprising the series and crossarm impedances of the lattice-type network can be positioned to form a delay equalizer network which can be cascaded with the lattice-type filter described above to produce an overall filter system whose delay response curve is substantially flat across the desired passband.

The above and other objects and features of the invention will be more fully understood from the following detailed description thereof when read in conjunction with the drawings in which.

Figure 1:
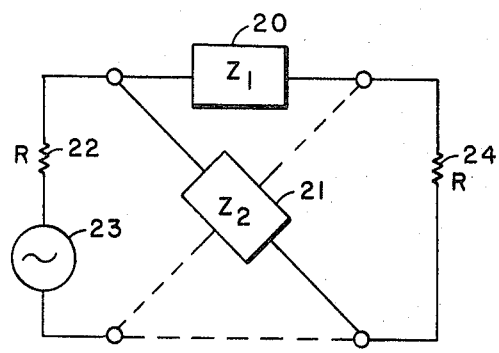
FIG. 1 is a schematic diagram of a conventional lattice network.
Figure 2:
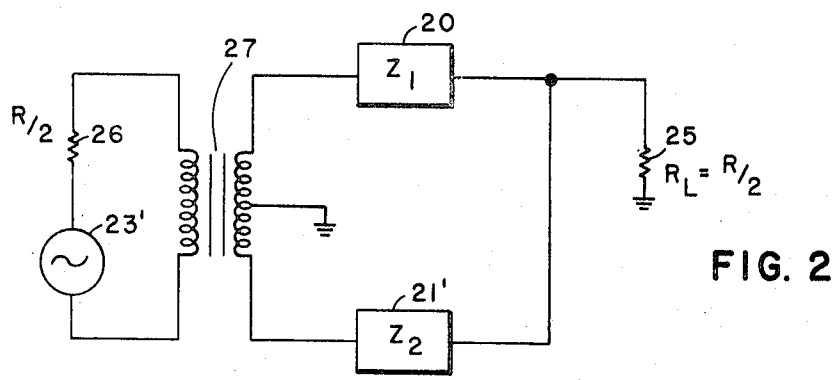
FIG. 2 is a schematic diagram showing a hybrid form of the lattice diagram of FIG. 1.
Figure 12:
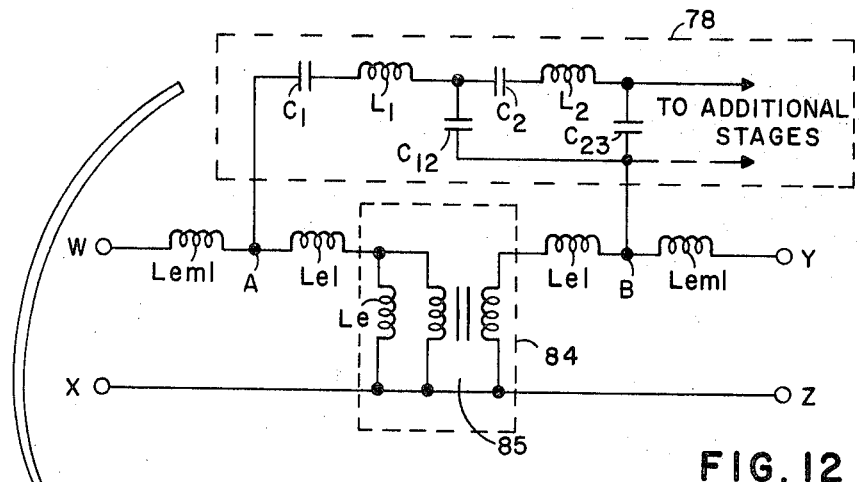
Figure 15:
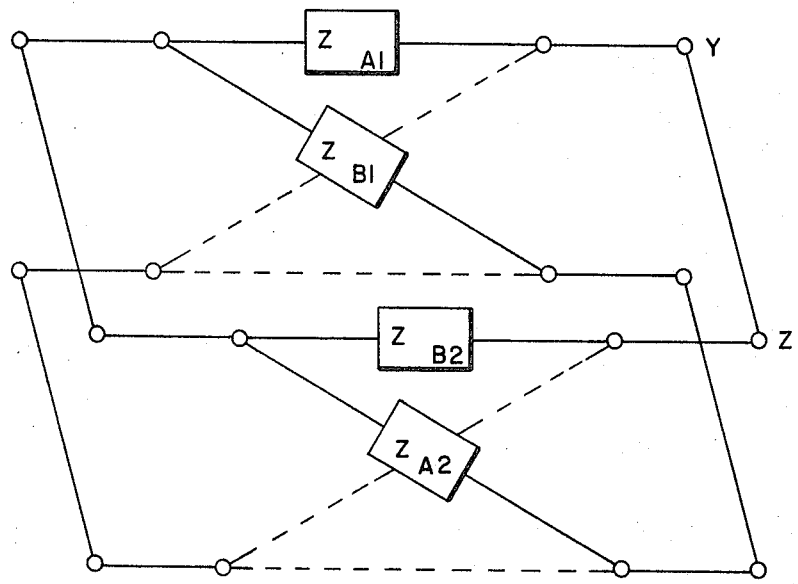
Figure 16:
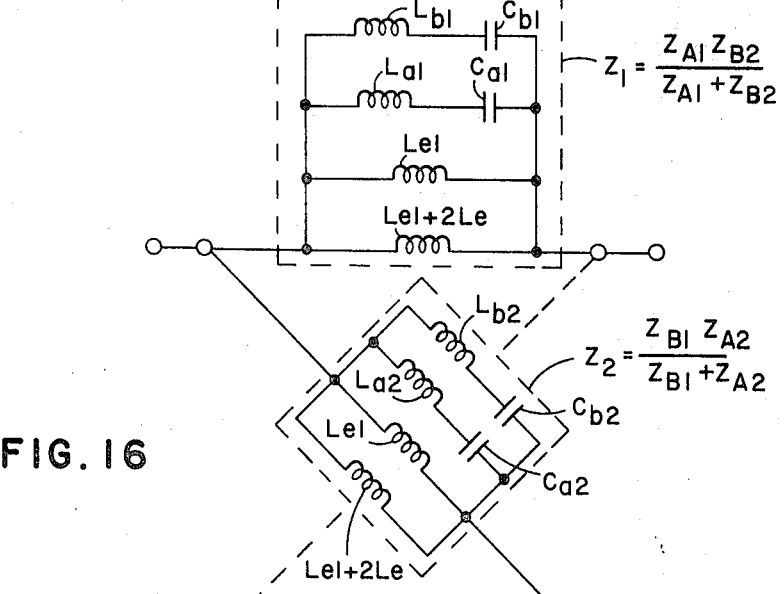
Figure 17:
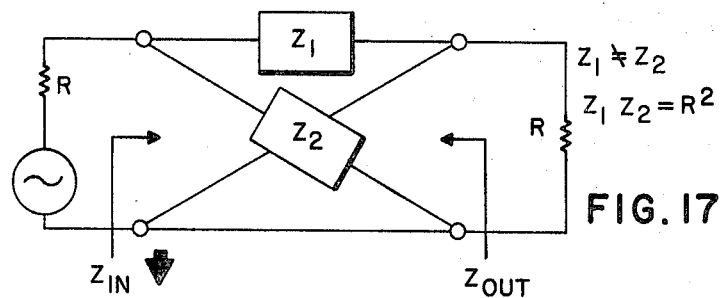
Figure 18:
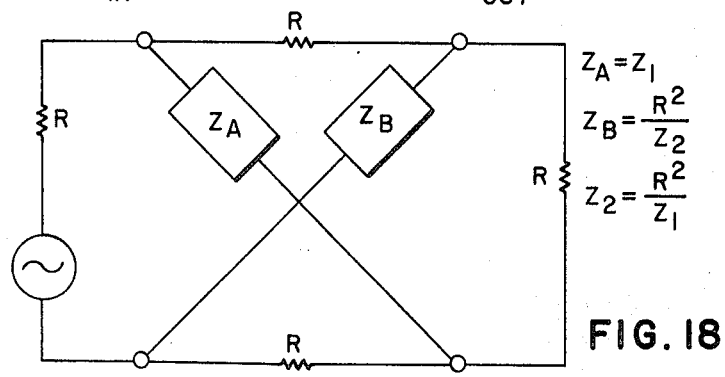
Figure 19:
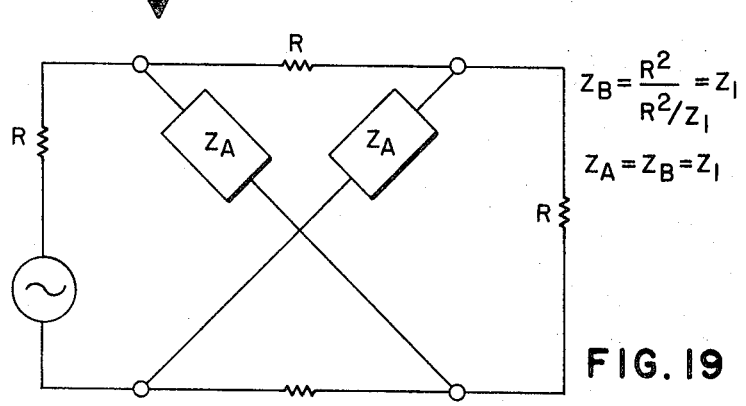
Figure 20:
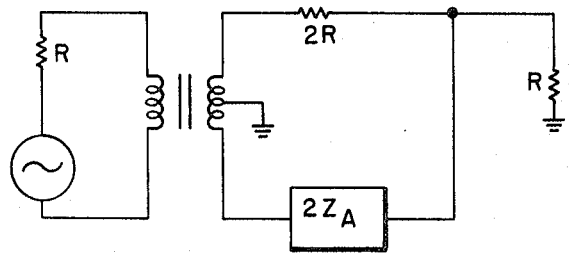
Figure 21:
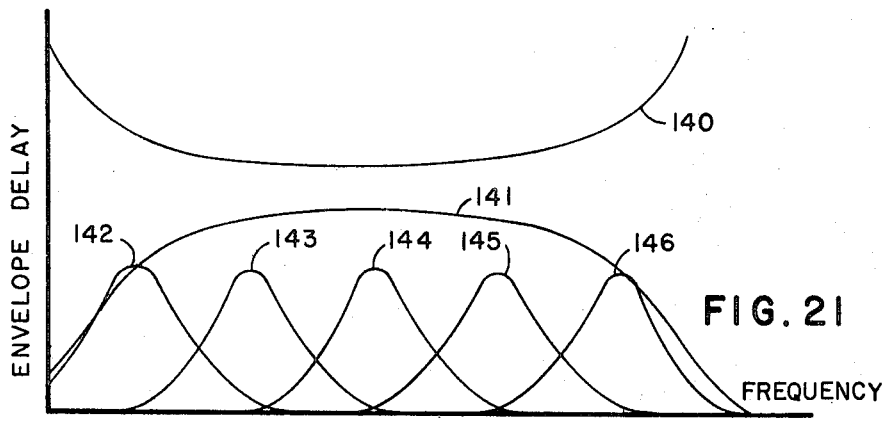
Figure 22:
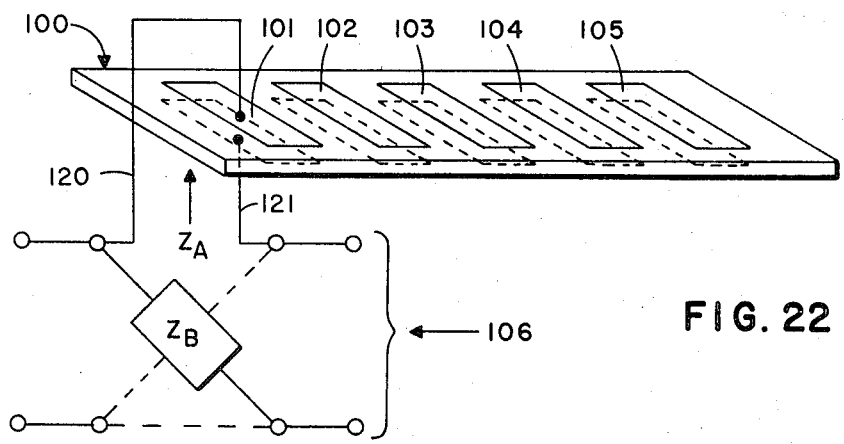
Figure 23:
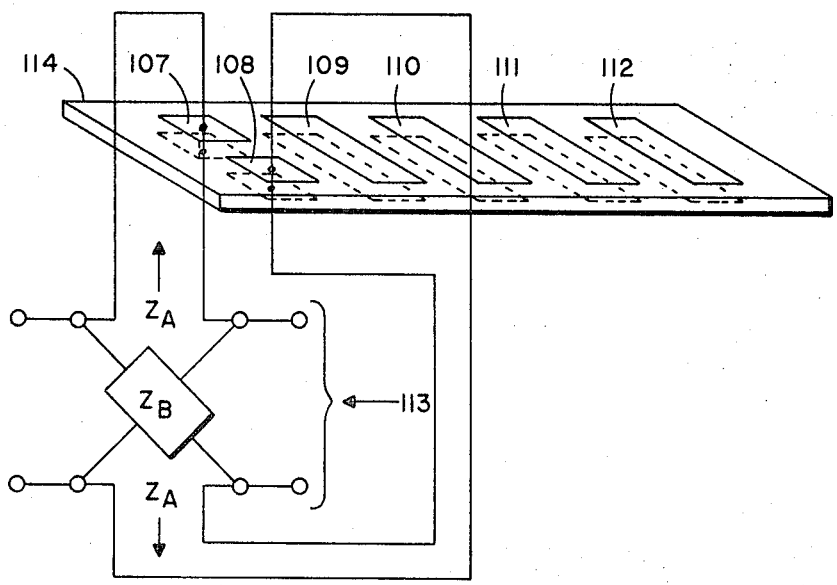
Figure 24:
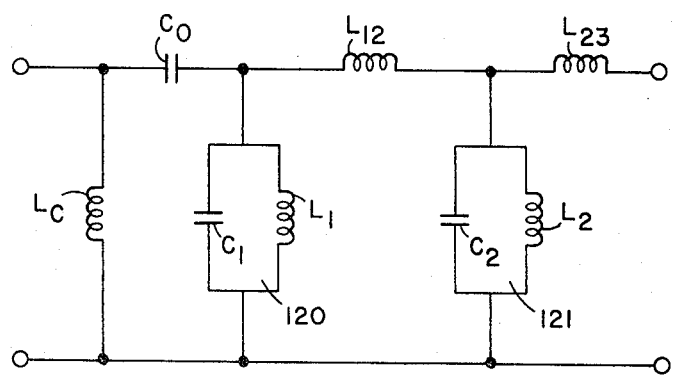

FIGS. 12a through 12d, 13, and 14 show circuit transformations employed in transforming the circuit of FIG. 12 to that of FIG. 1;

FIGS. 15 and 16 show the adaption of the transformations of FIGS. 12 through 14, which represent the case of a single disc-wire section, to the case of two disc-wire sections arranged to form a lattice-type network;

FIGS. 17, 18, and 19 are diagrams of a lattice-type network and show the transformation from a conventional lattice network of FIG. 17 to the Darlington form of the network shown in FIG. 19 wherein the series arm impedances are resistive in nature;

FIG. 20 is a hybrid form of the circuit of FIG. 19;

FIG. 21 is a set of frequency response curves showing the delay response curve of the lattice filter of FIGS. 1 or 2 and the delay response curve of the delay equalizer circuit of FIGS. 18, 19, or 20;

FIG. 22 shows a perspective view of a monolithic crystal having a plurality of resonators formed thereon, and which is employed as a driving point impedance in a lattice-type network;

FIG. 23 is similar to FIG. 22 except that one monolithic crystal has two inputs and is employed to form a pair of driving point impedances of a lattice network;

FIG. 24 is an equivalent circuit of the structure of FIG. 23; and

Figure 26:
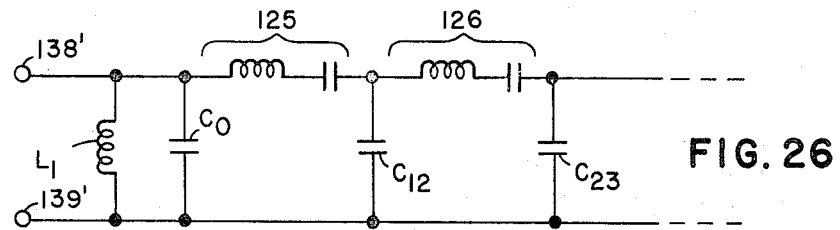
Figure 27:
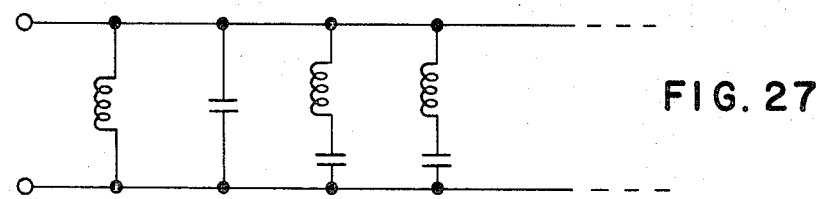
Figure 28:
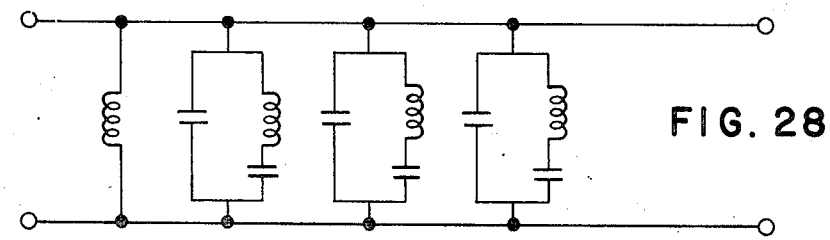
Figure 29:
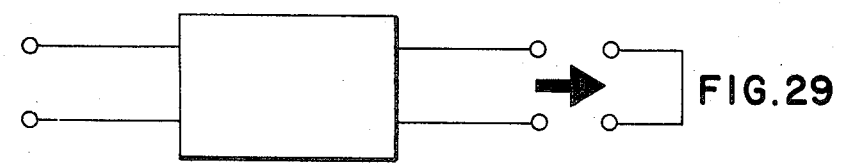

FIGS. 25 through 29 are circuit transformations showing the equivalency of the circuit of FIG. 24 with that of FIG. 28.

The following specification will be discussed in sections as set forth below.

I. General Case of Lattice Filter Employing Disc-Wire Impedances
II. Special Case of Lattice Filter Where the Pair of Series Arm Impedances and the Pair of CrossArm Impedances Each Use a Common Disc-Wire Structure
III. Lattice-Type Delay Equalizer Employing Disc-Wire Impedances
IV. General Case of Lattice-Type Filter Employing Monolithic Crystal Impedances
V. Special Case of Lattice Filter Where the Two Series Arm Impedances and the Two CrossArm Impedances Each Use a Common Monolithic Crystal Impedance
VI. Lattice-Type Delay Equalizer Employing Monolithic Crystal Impedances

I. GENERAL CASE OF LATTICE FILTER EMPLOYING DISC-WIRE IMPEDANCES

Referring now to FIG. 1, there is shown a conventional lattice-type network having an input signal source 23, a source resistance 22, series arms $Z_1$, one of which is shown and identified by reference character 20, and crossarm impedances $Z_2$, one of which is shown and identified by reference character 21. The filter is terminated in resistance $R$ which is preferably equal to source resistance 22.

In FIG. 2, there is shown the hybrid form of the lattice network of FIG. 1. FIG. 2 is the full equivalent of FIG. 1. In FIG. 2, however, the signal source 23' and the source impedance 26 are coupled to the $Z_1$ and $Z_2$ impedances through transformer 27. Such a transformer permits a matching of impedances. For example, the source impedance could be some impedance other than $R/2$ and could be matched to the remainder of the filter circuit simply by the selection of a proper turns ratio of transformer 27.

Figure 2A:
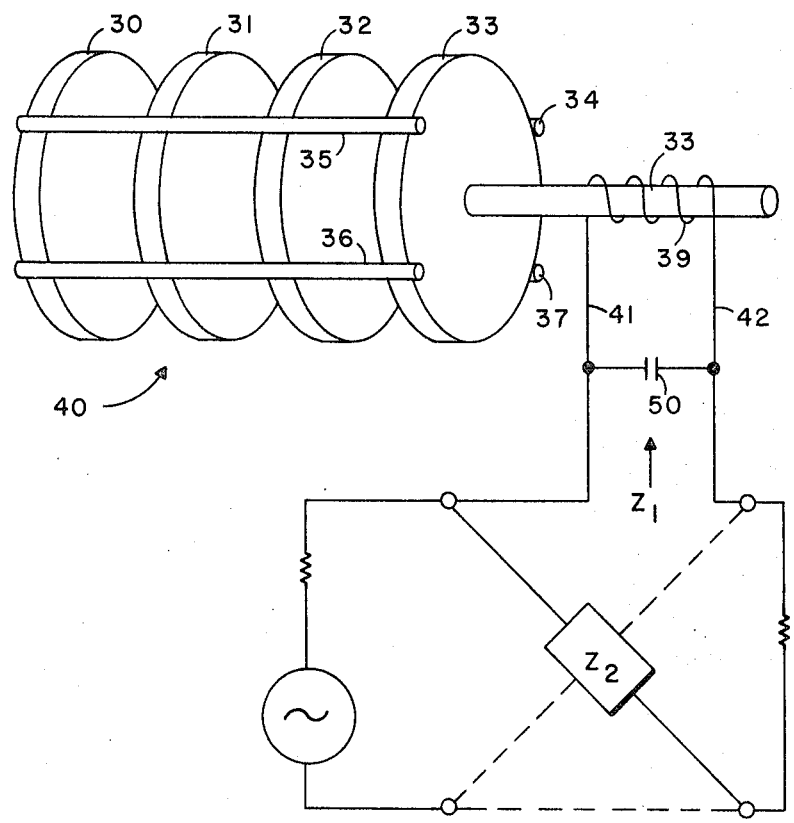
FIG. 2a is a perspective view of a disc-wire section.

Both in FIG. 1 and FIG. 2, the impedances $Z_1$ and $Z_2$ in the present invention are comprised of disc-wire structures as shown in FIG. 2a. In FIG. 2a, the disc-wire structure 40 is in fact a two-terminal impedance with its input consisting of input terminals 41 and 42 of winding 39. Said winding 39 is wound on transducer 38 which is preferably a rod of magnetostrictive material. The signal supplied across coil 39 causes vibrations in the rod 38 which are transmitted to the disc 33 and then through coupling wires 34, 35, 36, and 37 into discs 32, 31, and 30.

An alternate structure is that shown in FIG. 2a makes use of a piezoelectric ceramic transducer (not shown in the drawings) in the place of the ferrite rod.

In FIG. 2a, it can be seen that the disc-wire structure constitutes a driving point impedance $Z_t$ which is, namely, into the two input terminals 41 and 42. As discussed above, the disc-wire arrangement has many similarities to the well-known conventional disc-wire mechanical filter. For a general background of disc-wire mechanical filter arrangements and the theory of operation, much of which is applicable to the present situation, reference is made to the following U.S. patents which are incorporated herein by reference. U.S. Pat. No. 3,135,933 issued Jun. 2, 1964, to R.A. Johnson and entitled "M-Derived Mechanical Filter;" U.S. application Ser. No. 547,947, filed May 5, 1966, now U.S. Pat. No. 3,440,574 by R.A. Johnson and R.J. Teske and entitled "A Mechanical Filter Having General Stopband Characteristics;" U.S. application Ser. No. 557,300, filed Jun. 13, 1966, by D.L. Bise and entitled "Mechanical Filter with Attenuation Poles on Both Sides of Passband;" U.S. application Ser. No. 614,185, filed Feb. 6, 1967, now U.S. Pat. No. 3,516,029 by R.A. Johnson and entitled "Mechanical Filters Employing Multimode Resonators;" U.S. application Ser. No. 614,621, filed Feb. 8, 1967, now U.S. Pat. No. 3,488,608 by R.A. Johnson and entitled "General Stopband Mechanical Disc Filter Section Employing Multimode Discs."

As described in the above United States patents and applications, the disc-wire structures have a plurality of complex frequency plane poles and zeros which are determined by the number of discs in the structure and also by the manner in which the discs are coupled together by coupling wires. A more detailed discussion of the foregoing relation will be set forth herein later.

Figure 4:
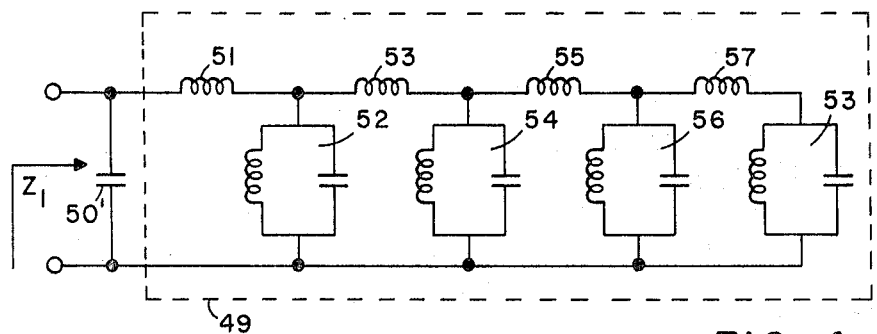
FIG. 4 is an equivalent circuit of a disc-wire structure such as shown in FIG. 2a and which can be employed as either the $Z_1$ or the $Z_2$, , i.e., either the series arm or the crossarm impedances of the structure of FIG. 1.

Referring now to FIG. 4, there is shown an equivalent circuit of the disc-wire structure 40 of FIG. 2a. More specifically in FIG. 4, capacitor 50' corresponds to the capacitor 50 of FIG. 2a, and inductor 51 corresponds to the coil inductance of winding 39 of FIG. 2a, The first tuned circuit 52 of FIG. 4 corresponds to the combination of the magnetostrictive rod 38 and the end disc 33 of FIG. 2a, inductor 53 corresponds to the coupling wires between discs 33 and 32 of FIG. 2a, the tuned circuits 54, 56, and 58 correspond respectively to the discs 32, 31, and 30, and the inductors 55 and 57 correspond to the coupling wires between discs 32 and 31 and discs 31 and 30, respectively.

Figure 3:
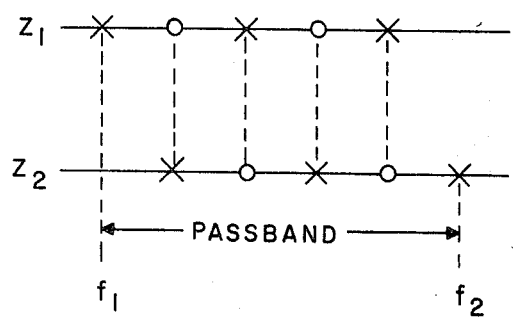
FIG. 3 is a plot of the poles and zeros of the series and crossarm impedances of the circuits of FIG. 1 and 2.

As discussed generally above, the disc-wire structure of FIG. 2a has a plurality of driving point poles and zeros as shown in the impedance $Z_1$ representation of FIG. 3. The poles and zeros, as is well known in the art, occur alternately, though not necessarily coincident as shown. In the representation of FIG. 3, the $X$'s represent poles and the $O$'s represent zeros. The impedance $Z_2$ of FIG. 2a, which is also a disc-wire arrangement similar to that representing $Z_1$, is shown in the lower pole-zero chart of FIG. 3 and identified as $Z_2$. It can be seen from FIG. 3 that the poles and zeros of the two impedances $Z_1$ and $Z_2$, in this case, are aligned so that the zeros of $Z_1$ coincide with the poles of $Z_2$ and the poles of $Z_1$ coincide with the zeros of $Z_2$. An exception is the first pole of $Z_1$ and the last pole of $Z_2$, both of which have no coinciding zero in the other impedance. These two poles define the limits of the passband at about 3 db. level; said passband limits being defined as lying between frequencies $f_1$ and $f_2$ in FIG. 3.

By proper design of the disc-wire impedances, a resultant lattice filter can be obtained having either a narrow passband or a wide passband. The wide passband design is shown generally by the zero-pole representation in the diagram of FIG. 5 whereas the narrow passband configuration is shown by the pole-zero representation of FIG. 6.

Figure 5:
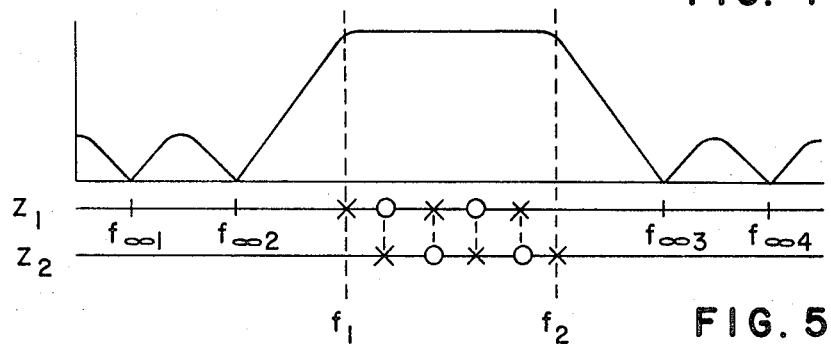
FIG. 5 is a possible frequency response curve of the structure of FIG. 1 or FIG. 2 with a given positioning of poles and zeros of the series and crossarm impedances, which positioning provides a relatively wide bandwidth.
Figure 6:
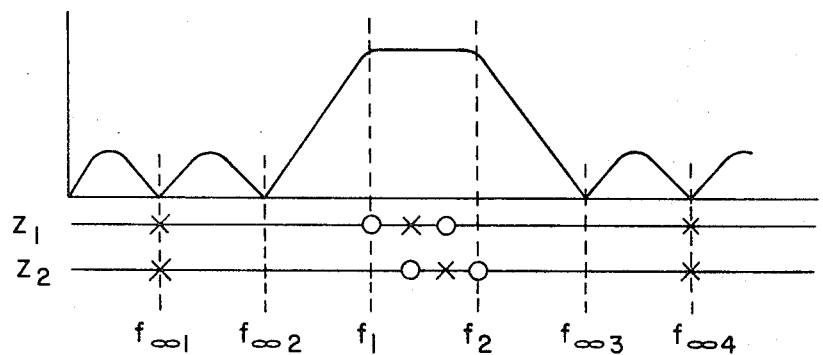
FIG. 6 is another frequency response curve of the structure of FIG. 1 or FIG. 2 with a different positioning of the poles and zeros of the series and crossarm impedances, which provides a relatively narrow band-pass filter.

The basic difference between the structures represented by the diagram of FIG. 5 and 6 is that in FIG. 6 the end poles of impedances $Z_1$ and $Z_2$, which occur at frequencies of $f_{\infty1}$ and $f_{\infty4}$ have been pulled out well away from the passband, which is defined as occurring between frequencies of $f_1$ and $f_2$. In FIG 5 on the other hand, all of the poles of the two impedances $Z_1$ and $Z_2$ fall within the passband, with the lower and upper frequency limits of the passband being defined substantially by the extreme left-hand and right-hand poles of the impedances $Z_1$ and $Z_2$ respectively. There are no poles in the structure represented by FIG. 5 which are removed out and away from the passband, defined as lying between frequencies $f_1$ and $f_2$.

One of the advantages of the structure represented by FIG. 6 over that represented by FIG. 5, is that the structure of FIG. 6 is more stable, particularly from a temperature variation standpoint and also has less loss than the structure of FIG. 5. The reasons for the foregoing advantages of the structure of FIG. 6 can better be understood with the aid of FIGS. 7, 8, and 9.

Figure 7:
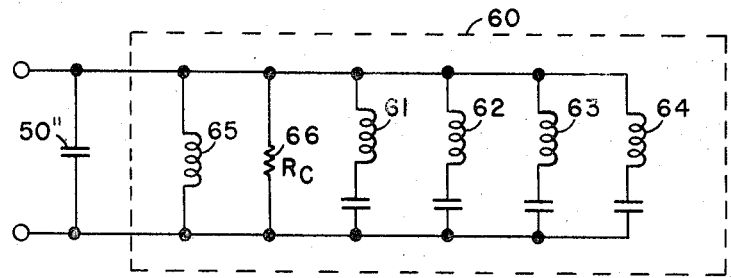
FIG. 7 is an equivalent circuit of $Z_1$ or $Z_2$ of the lattice network of FIG. 1 and is another form of the equivalent circuit of FIG. 4.

In FIG. 7 the portion of the circuit within the dotted block 60 corresponds to that portion of the circuit of FIG. 4 within the dotted block 49. Transformations needed to convert the network from one form to the other are well known in the art and will not be discussed further herein.

The capacitor 50" of FIG. 7 corresponds to the capacitor 50' of FIG. 4 and the inductor 65 of FIG. 7 is approximately the same value as the inductor 51 of FIG. 4. Thus, in FIG. 7, the capacitor 50'' represents the capacitor 50 across the input coil winding 39 of FIG. 2a and the inductor 65 is representative of the inductance of said winding 39. These two elements, capacitor 50'' and inductor 65, form a tuned circuit at a certain frequency and it is usually desirable that such frequency be at the center of the passband. However, it is also desirable that the amplitude response of the filter be made as insensitive to changes in capacitor 50'' and inductor 65 due to change in temperature as possible. Such insensitivity to temperature can be obtained by making the inductor 65 very large and the capacitor 50'' very small. As this is done, the coincident poles under $f_{\infty 1}$ and $f_{\infty 4}$ of FIG. 6 are moved out increasingly far from the passband between $f_1$ and $f_2$. Since these poles are removed so far from the center of the passband, changes in capacitor 50'' and inductor 65 due to temperature and age will have relatively little effect on the passband area between frequencies $f_1$ and $f_2$.

The second advantage of the structure represented by FIG. 6 over that of FIG. 5 is a lower loss. Such lower loss is explained in the following manner. The inductor 65 of FIG. 7, which represents the inductance of the disc-wire input winding, has a resistive loss which in FIG. 7 is identified as $R_c$. For purposes of analysis, $R_c$ has been removed from the inductor 65 and placed in parallel therewith.

Figure 8:
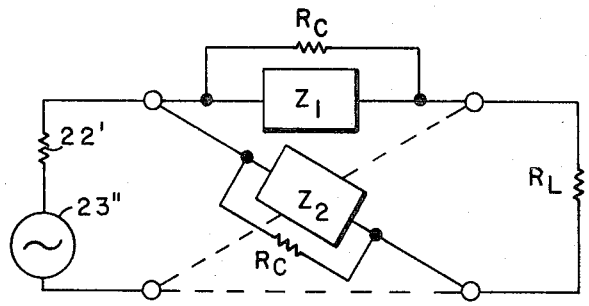
FIG. 8 is another block diagram of a lattice-type network which is included in the specification to illustrate how wideband or narrowband response curves can be obtained with the use of the disc-wire impedance arrangements.

In FIG. 8 the lattice network is drawn with the $R_c$'s shown in parallel with the impedances $Z_1$ and $Z_2$. It is to be understood that the impedances $Z_1$ and $Z_2$ are thus modified to the extent that the resistance of the input winding has been extracted therefrom leaving only purely reactive components of L and C in impedances $Z_1$ and $Z_2$.

Figure 9:
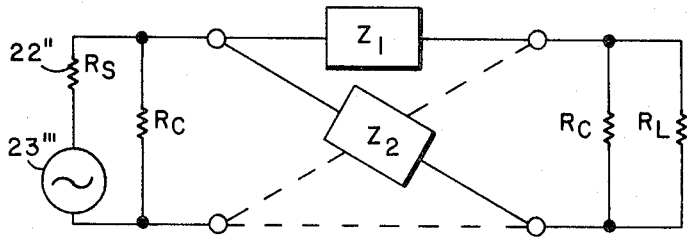
FIG. 9 is another diagram of a lattice network and in effect is a transformation of FIG. 8 to facilitate the explanation thereof.

In accordance with Bartlett's theorem it can be shown that the resistance $R_c$ of FIG. 8 can be repositioned as shown in FIG. 9, with the resultant circuit being the full equivalent of the circuit shown in FIG. 8.

From FIG. 9, it can be seen that if $R_c$ has a low value, for example zero as a limiting case, no energy can be transferred from the source 23'' to the load resistor $R_L$. Further, if $R_c$ is equal to the required value of $R_L$, the source resistance 22'' must become infinite in order to properly terminate the filter. Therefore, in order to get the required transfer response, i.e., within a predetermined ripple, $R_c$ must not drop below the required value of terminating resistance $R_l$.

Actually it is desirable to make $R_c$ fairly large since source resistance $R_s$ can then be made fairly small, thus permitting an increased amount of energy to be transferred into and through the filter.

The resistance $R_c$ will become large incidental to the spreading of the poles away from the passband. More specifically, as the input winding inductance, such as inductance 65 of FIG. 7, increases, the poles of input impedance $Z_1$ are moved farther out from the passband. As the inductance increases, the inherent resistance $R_c$ therein also increases.

In summary, it can be stated that the filter structure represented by the diagram of FIG. 5 can realize a wider passband than that of FIG. 6, but for the same bandwidth has less stability particularly with respect to temperature and aging, and has more power loss than the structure of FIG. 6. The structure represented by the diagram of FIG. 6 is particularly applicable where the narrow passband with stability characteristics and low power loss is needed.

II. SPECIAL CASE OF LATTICE FILTER WHERE THE PAIR OF SERIES ARM IMPEDANCES AND THE PAIR OF CROSSARM IMPEDANCES EACH USE A COMMON DISC-WIRE STRUCTURE

When using a full lattice network as shown in FIG. 1, it is possible to realize both of the $Z_1$'s, or both of the $Z_2$'s, with a single disc-wire impedance structure.

Figure 10:
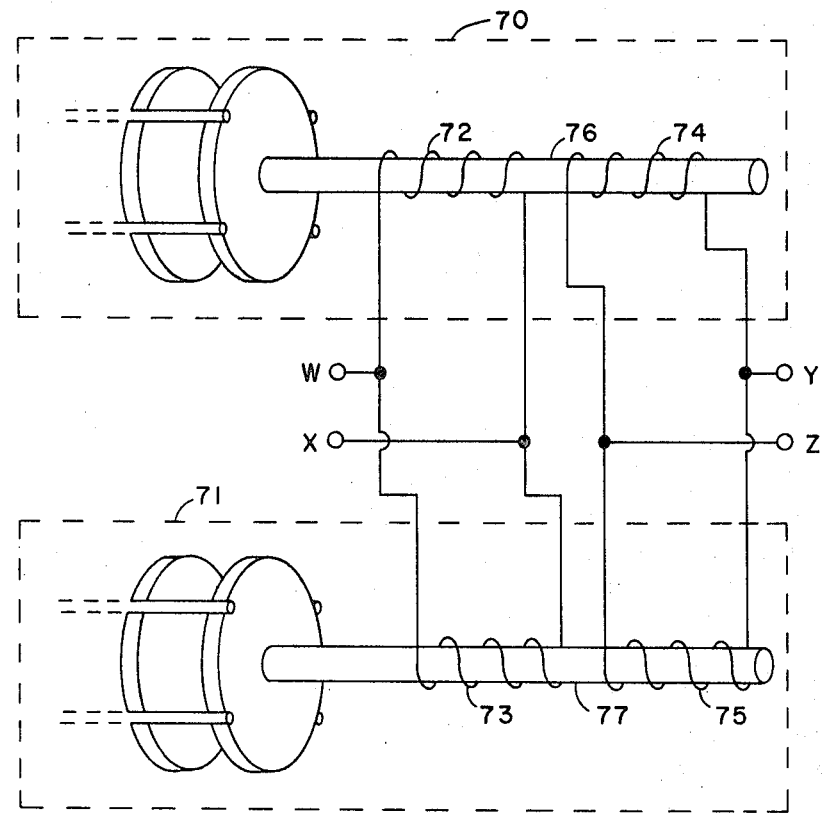
FIG. 10 shows the input connections to a pair of disc-wire sections to form lattice-type network, with each disc-wire section representing one of the two pairs of Z impedances.

For a general understanding of how the foregoing is accomplished, reference is made to the structure of FIG. 10 wherein the input terminals to the lattice network are identified as terminals W and X, and the output terminals as Y and Z. The input terminals W and X are connected to coils 72 and 73 which are wound around magnetostrictive transducers 76 and 77 of disc-wire structures 70 and 71, respectively. Similarly, the output terminals Y and Z of the lattice network are connected to windings 74 and 75 which are arranged in parallel and wound around the magnetostrictive transducers 76 and 77, respectively, of the two disc-wire structures 70 and 71.

In the following paragraphs, it will be shown first that the two windings 72 and 74 and transducer 76 of disc-wire structure 70 will have an equivalent lattice-type matrix as shown in FIG. 14. It can be seen from FIG. 14 that the series arms are relatively complex compared to the crossarm impedances, the crossarm impedances not being realizable by a disc-wire structure.

Consequently, it will next be shown that the disc-wire structure 71 of FIG. 10 will produce a second lattice-type filter of the form shown in FIG. 14. Now if the two lattice-type filter structures derived respectively from disc-wire structure 70 and disc-wire structure 71 of FIG. 10 are connected in parallel, but with two of the terminals reversed as shown in FIG. 15, there will then be obtained the resultant lattice filter structure of FIG. 16, wherein both the series arm and the crossarm impedances are of a type realizable by disc-wire structures.

It is then possible to work back from the diagram of FIG. 16 to an actual physical disc-wire structure of the type shown in FIG. 2a which will produce the impedances $Z_1$ and $Z_2$ of FIG. 16 when employed as the common disc-wire structure as shown in FIG. 10.

Figure 11:
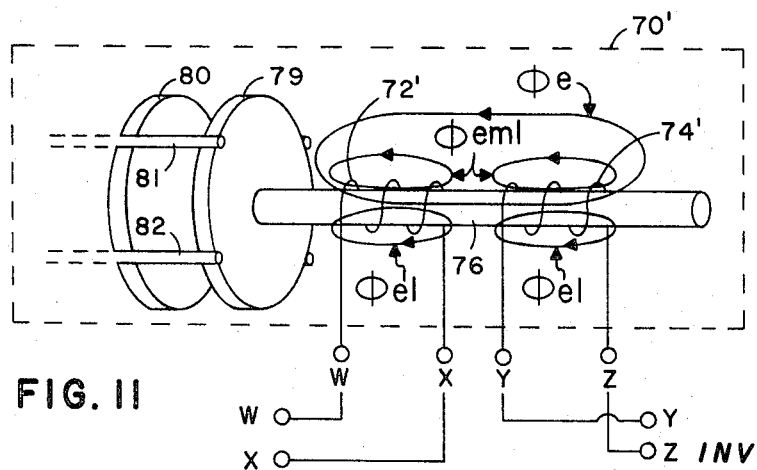
FIG. 11 shows the input connections to a single disc-wire section when employed to form a pair of Z impedances, and further shows the various magnetic flux paths created thereby.

Considering now the action of a single disc-wire structure such as disc-wire structure 70 of FIG. 10, which is shown separately in FIG. 11, the several inductive couplings created by the two windings 72' and 74' wound on transducer 76 are shown.

More specifically, the flux $\phi_e$ is that magnetic flux common to both windings. Flux $\phi_{el}$ is that flux which links only the turns of the first winding 72' or the second winding 74', and the flux $\phi_{eml}$ is the leakage flux which neither links both windings nor the transducer rod. The value of each corresponding inductance, shown in the equivalent circuits of FIG. 12, is proportional to the magnitude of the corresponding magnetic flux. The inductors of FIG. 12 are identified by subscripts similar to the subscripts of the various magnetic fluxes of FIG. 11.

Comparing FIGS. 11 and 12 further, if flux $\phi_e$ approaches zero, then the inductance $L_e$ of FIG. 12 approaches zero and the only coupling between input terminals W and X output terminals Y and Z is through the mechanical network represented by the circuit within the dotted block 78 of FIG. 12. In block 78, the components $C_1$ and $L_1$ represent a disc, as do $C_2$ and $L_2$. The capacitors $C_{12}$ and $C_{23}$ represent the coupling wires such as coupling wires 81 and 82 between the discs 79 and 80 of FIG. 11.

In transforming the circuit of FIG. 12 to that of FIG. 13, two principal transformations are made. Firstly, the circuit within the dotted block 78 of FIG. 12 is transformed into the circuit within blocks 78' and 78'' of FIG. 13, using the transformations shown in FIG. 12a through 12d respectively.

Secondly, the circuit within dotted block 84 of FIG. 12 is transformed into the circuit within dotted block 84' of FIG. 13.

Considering the latter transformation first, the perfectly coupled transformer 85 of FIG. 12 is converted to its "tee" equivalent having series arm inductors equal to $2L_e$ and a shunt arm inductor equal to $-L_e$. The shunt-arm inductor $-L_e$ is broken up into two shunt arm inductors each equal to $-2L_e$ and identified by reference characters 91 and 92 in FIG. 13. The two series arm inductors, each equal to $2L_e$, are split into four series arm inductors each equal to a single $L_e$ and identified by reference characters 87, 88, 89, and 90 in FIG. 13.

Figure 12A:
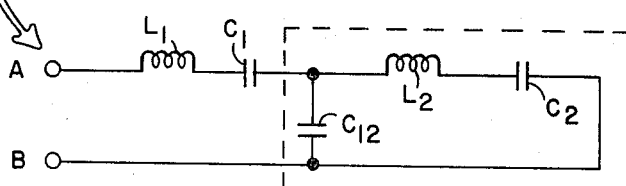

The transformation of the circuit within dotted block 78 of FIG. 12 to that within dotted block 78' and 78'' of FIG. 13 is as follows. FIG. 12a shows the first transformation of a two-resonator example circuit within the block 78. This is a standard transformation of the series arrangement of two capacitors and an inductor. Note that $C_{23}$ is shorted in this two resonator case.

Figure 12B:
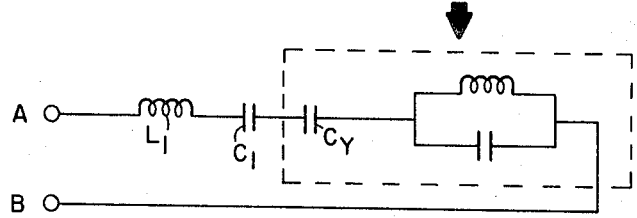
Figure 12C:
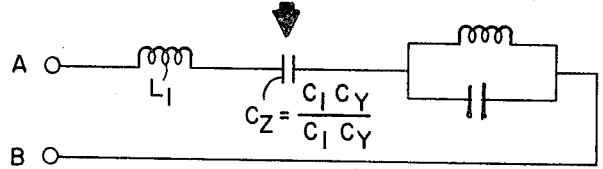

A transformation from the circuit of FIG. 12a to that of FIG. 12b and subsequently to 12c and 12d, are all standard transformations and need no further discussion herein.

Figure 12D:
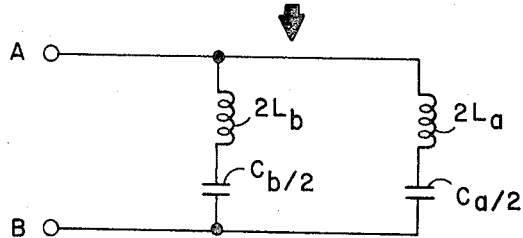

The final circuit shown in FIG. 12d is then separated into four quadrants as shown in the dotted blocks 78' and 78'' of FIG. 13. Specifically, for example, the inductor $2L_b$ of FIG. 12d is broken down in FIG. 13 into four inductors each equal to $L_b/2$. Similarly, the inductor $2L_a$ of FIG. 12d is broken down in FIG. 13 into four inductors each equal to $L_a/2$. Similarly, capacitors $C_b/2$ and $C_a/2$ are each broken down into four capacitors being equal to either $2C_a$ or $2C_b$.

It will be observed that the circuit of FIG. 13 is now a balanced network divided substantially into four quadrants and is susceptible to application of Bartlett's bisection theorem. The application of the Bartlett's bisection theorem gives the circuit of FIG. 14.

To understand more fully the transformation of the circuit of FIG. 13 to FIG. 14, a brief statement of Bartlett's theorem follows. Bartlett's theorem states that if a balanced circuit such as shown in FIG. 13 is split in the middle, i.e., along the dotted line 95 of FIG. 13, certain impedances can be derived which constitute the series arm and crossarm impedances of a lattice network such as shown in FIG. 14.

More specifically, to find the shunt impedance $Z_{A1}$ of FIg. 14, the circuit of FIG. 13 is first cut along dotted line 95, then one of the halves is short circuited along said dotted line 95, and the impedance looking into the terminals W and X is determined. Such impedance forms the series arm impedance $Z_{A1}$ of FIG. 14.

To find the shunt-arm of the lattice network of FIG. 14, the impedance looking into terminals W and X is determined with the conductors lying along dotted line 95 being left open circuited. Under such conditions, the 2 $L_e$'s 87 and 88 cancel with the two inductors 91 and 92 (2 $L_e$), leaving only the two $L_{e1-s}/2$ remaining, which when added together give a single $L_{e1}$ for the shunt arm $^zb_1$ of FIG. 14.

As discussed above, the circuit of FIG. 14 represents an equivalent lattice filter employing only the disc-wire structure 70 or FIG. 10. Also, as discussed above, the shunt arms $^zB_1$ of FIG. 14 do not contain the necessary components needed to realize a good lattice-type filter. A sufficient number of poles and zeros are not obtainable with the shunt arm $^zB_1$. A circuit more in the nature of FIG. 16 is needed wherein a plurality of poles and zeros are obtainable in both the shunt arm impedances and the series arm impedances.

To obtain the lattice filter of FIG. 16, the second disc-wire structure 71 of FIG. 10 is employed. An exactly similar equivalent circuit for the disc-wire structure 71 can be set up as was set up for the disc-wire structure 70 of FIG. 10. Such an equivalent circuit will be as is shown in FIG. 13, but will have different inductive and capacitive values.

Similar transformations will then result in a circuit as shown in FIG. 14, but again with different inductive and capacitive values, depending upon the particular physical parameters of the discs, coupling wires and the transducer of the disc-wire structure 71 of FIG. 10. Then if the crossarm and series impedances $^zB_2$ and $^zA_2$ in the equivalent circuit of disc-wire structure 71 are connected in parallel, but with reversed terminals, to the equivalent circuit derived from the disc-wire structure 70 of FIG. 10, there is obtained two lattice-type networks which are connected in parallel as shown in FIG. 15. It is to be specifically noted, however, that the $^zA_2$ and $^zB_2$ impedances which are derived from the disc-wire structure 71 of FIG. 10 are reversed from the $^zA_1$ and $^zB_1$ impedances derived from the disc-wire structure 70. Worded in still another way, the impedances $^zB_1$ of the lattice network derived from the disc-wire structure 71 are employed as series arm impedances whereas the corresponding impedance in the lattice network derived from the disc-wire structure 70 are employed as crossarm impedances in the circuit of FIG. 15.

In FIG. 16, the two parallel connected lattice circuits of FIG. 15 have been combined and the resultant impedances identified as $Z_1$ and $Z_2$, with $Z_1$ being the series arm impedance and $Z_2$ being the shunt arm impedance.

The foregoing description of a full lattice network containing a single disc-wire structure to realize both $Z_1$ arms has been centered around magnetostrictive transducers. Equally valid is a split plate piezoelectric transducer vibrating in a longitudinal mode. For a detailed discussion of such a transducer reference is made to a book by W. P. Mason entitled "Electromechanical Transducers and Wave Filters" published by Van Nostrand Publishing Company in New York in 1948.

III. LATTICE-TYPE DELAY EQUALIZER EMPLOYING DISC-WIRE IMPEDANCES

The single driving point disc-wire impedance structure can also be employed in delay equalizers having the general lattice network configuration. More specifically, reference is made to FIG. 17 wherein there is shown an all pass constant resistance phase equalizer employing the lattice network configuration. In FIG. 17 the following expression is true.

$Z_{IN}=Z_{OUT}=\sqrt{Z_1 Z_2}=R$

The foregoing expression means that the circuit of FIG. 17 has a constant driving point impedance of $R$ for all frequencies. Consequently, the amplitude attenuation through the circuit of FIG. 17 remains constant, but the circuit can be designed to have a phase delay which is compensatory to some other circuit such as the filter circuit of FIG. 1. Thus the resultant overall delay characteristic of a filter cascaded with an equalizer will be substantially flat. Because the amplitude attenuation of the circuit of FIG. 17 is constant, it will introduce no amplitude distortion into the signal being processed. On the other hand, the poles and zeros of the circuit of FIG. 1 can be arranged so that the phase delay of certain frequencies can be made compensatory with the delay characteristic of a conventional filter.

A disadvantage of the circuit of FIG. 17, however, is that it is very difficult to realize practically, either in terms of conventional inductances and capacitances or in terms of the disc-wire structure of the present invention. Consequently, it has been found desirable to go to equivalent circuits such as the one shown in FIG. 18. It should be noted that the structure of FIG. 18 is prior art and is the subject of U.S. Pat. No. 1,991,195 issued to Darlington. As disclosed in the Darlington patent, the impedances of the circuit of FIG. 18 can be made to bear certain relationships with the impedances of the circuit of FIG. 17. These relations are expressed below:

$Z_A = Z_1$
$Z_B = R^2/Z_2$
but
$Z_2 = R^2/Z_1$
therefore
$Z_B = R^2/R^2/Z_1 = Z_1$
thus
$Z_A = Z_B = Z_1$ Since $Z_A$ is equal to $Z_B$, the network of FIG. 18 can be redrawn as shown in FIG. 19. From the conventional lattice topology of FIG. 19, the hybrid circuit of FIG. 20 can be drawn, and is the full equivalent of the circuit of FIG. 19.

Returning again to consideration of FIGS. 17 and 18, it is to be noted that while the circuit of FIG. 18 has the same transfer characteristic as does the circuit of FIG. 17, that of FIG. 18 is not a constant resistance device. That is to say, the product of the two crossarm impedances does not equal a constant. However, the attenuation of FIG. 18 is a constant, but is about 6 db. below that of the circuit of FIG. 17.

Similarly circuits 19 and 20 which are the full equivalent of the circuit of FIG. 18, also have transfer characteristics which are the same as that of FIG. 17 but are not constant resistance devices and have a 6 db. attenuation below the circuit of FIG. 17.

In FIG. 20, which can be utilized as a delay equalization circuit, the impedance $Z$ is a single driving point disc-wire structure having a plurality of poles and zeros, depending upon the number of discs in the arrangement.

In FIG. 21 there are shown two delay curves. The curve 140 shows the group delay characteristic of a filter of the type discussed in connection with FIG. 1 and using the disc-wire structures of the present invention. The curve 141 shows the type of group delay obtainable with the circuit of FIG. 20 wherein the impedance $Z_A$ is comprised of a disc-wire arrangement having a plurality of poles and zeros arranged to delay the response across the desired passband in accordance with the curve 141 of FIG. 21. The responses of individual factors in the transfer function of the network FIG. 20 which combine to form the delay characteristic 141 are identified by reference characters 142 through 146.

The positioning of poles and zeros in the $Z_A$ arm is effected either from design techniques set forth in the patents and applications cited herein, by other analysis techniques or, alternatively, they can be obtained by test and measuring techniques.

Regardless of how the poles and zeros are positioned in the impedance $Z_A$ of FIG. 20, the attenuation over the band of frequencies is constant by definition and only the nature of the driving point impedance changes, i.e., the impedance becomes capacitive and inductive at various points of the passband.

IV. GENERAL CASE OF LATTICE-TYPE FILTER EMPLOYING MONOLITHIC CRYSTAL IMPEDANCES

As in the case of the disc-wire lattice filter, the monolithic lattice filter has lattice arm impedances comprised of transducers and mechanical vibrating elements.

Referring now to FIG. 22, there is shown a monolithic crystal impedance comprised of a monolithic crystal plate 100 upon which are formed a plurality of pairs of conductive electrodes such as pairs of electrodes 101, 102, 103, 104, and 105. It is to be understood that while each reference character has a lead line going to only the upper electrode, there is an associated lower electrode on the bottom side of the plate, which is shown in a dotted form.

The first pair of electrodes, 101 form the input to the circuit and the two input leads 120 and 121 thereto are connected to lattice network 106 such that the monolithic structure forms the series impedance $Z_A$ of the lattice filter. It is to be understood that the other series impedance of the monolithic lattice-type filter and also the two crossarm impedances $Z_B$ are also each comprised of a monolithic crystal structure as shown in FIG. 22.

The resonant mode of the monolithic structure 100 is the so-called thickness-shear or thickness-twist mode of operation. In such a mode of operation, the energy is propagated from resonator to resonator as an exponentially decaying signal. The resonator is defined as the crystal structure lying between a pair of electrodes. The region between a pair of electrodes acts as a resonator in much the same way as a disc acts as a resonator in a mechanical filter or in a disc-wire lattice network, as described hereinbefore. The nonelectroded regions of the monolithic structure 100 of FIG. 22 act in a manner similar to the coupling wires of the disc-wire structure.

As in the case of the disc-wire structure described above, the monolithic structure 100 of FIG. 22 is utilized as a single driving point impedance which can be employed in the lattice networks shown in FIG. 22. In other words, the monolithic structure 100 of FIG. 22 is not being used as a four-terminal device but rather as a two-terminal device with each of said devices being employed in each of the four arms of the lattice filter.

In addition to being employed in the full lattice network as shown in FIG. 22, the monolithic structure can also be employed in the hybrid form of lattice network as shown in FIG. 2. More specifically, in FIG. 2, the impedance $Z_1$ can consist of the monolithic structure 100 of FIG. 22 as can the impedance $Z_2$. However, as in the case where disc-wire structures are used, the monolithic structures $Z_1$ and $Z_2$ are different in that the poles and zeros of each are shifted with respect to one another so as to align somewhat in accordance with the diagram of FIG. 3. In other words, similar but not identical monolithic structures can be used for both impedances $Z_1$ and $Z_2$ of FIG. 2.

However, in the case where the monolithic structures are employed in a full lattice filter network, a single monolithic structure can have two pairs of input terminals and can be employed, for example, as both of the $Z_B$ arm impedances of the filter, as shown in FIG. 23. Similarly both of the crossarm impedances $Z_b$ can utilize a second, common monolithic structure.

In FIG. 23, it can be seen that the monolithic crystal structure 114 has two pairs of input electrodes 107 and 108 with pair 107 providing the input means for one of the series arm impedances $Z_A$ and the second pair of input electrodes 108 providing the input means for the second series arm impedances $Z_A$.

Returning again to the structure of FIG. 22, some of the basic principles of operation thereof will now be discussed followed by a discussion of some equivalent circuits in order to more fully understand the structure.

In FIG. 22, the monolithic crystal structure 100 vibrates in the thickness-shear mode associated with an AT-cut crystal and, therefore, has the equivalent circuit shown in FIG. 24, which is the equivalent circuit of the stiffened mode device. By stiffened mode device it is meant that the electric field is in the direction of propagation of the acoustic wave. Thus in the thickness-shear mode, the wave is propagated in the thickness direction, which is parallel to the electric field.

In FIG. 24, $C_o$ is the capacitance between the electrode pair 101. In the case of wideband monolithic lattice filters a resonating coil $L_c$ must be used. This inductor can be used across the terminals or in series depending on the desired network realization. In the narrow bandwidth case no tuning coil is necessary. The tuned circuits 120 and 121 correspond to the plated areas of the monolithic structure and further correspond to the discs in the disc-wire impedance structure. The inductors $L_{12}$ and $L_{23}$ correspond to the regions between the plated areas. Through these regions between plated areas there passes sufficient amounts of energy from one plated area to another to create a resonating condition in each of the plated areas. It is to be noted, however, that these regions between electrodes have sufficient attenuation therein so that the different plated areas are able to resonate at different frequencies. It might also be noted that the inductors $L_{12}$ and $L_{23}$ correspond to the coupling wires of the disc-wire impedance structure.

Figure 25:
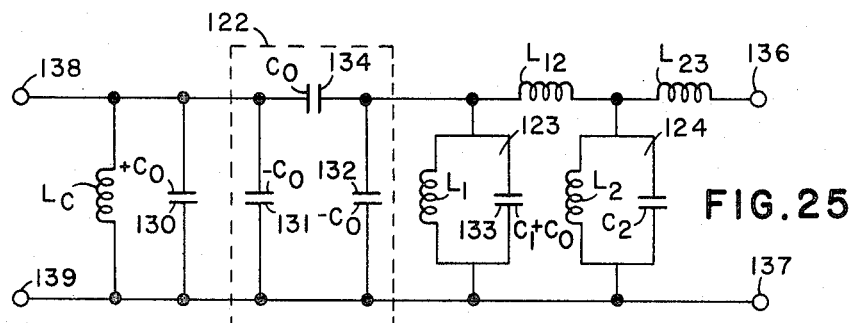

The circuit of FIG. 24 is transformed into the circuit of FIG. 25 by adding a $+C_o$ and a $-C_o$ in parallel with each other and identified by reference characters 130 and 131, and then further by adding the $-C_o$ identified by reference character 132 and adding a $+C_o$ to the capacitance $C_1$ to produce a resulting capacitance $C_1+C_o$, identified by reference character 133. Thus there has been added to the circuit two $+C_o$'s and two $-C_o$'s. The capacitor $C_o$ identified by reference character 134 corresponds to the capacitor $C_o$ in FIG. 24.

The purpose of adding and subtracting the $C_o$'s shown in the circuit of FIG. 25 is to produce the Pi circuit within the dotted block 122 which is comprised of a series $C_o$ and two $-C_o$'s in the shunt arms. Such a circuit is essentially what is known as an impedance inverter and is the equivalent of a ¼-wave transmission line.

It is a characteristic of an impedance invertor 122 to invert the impedance of all of the reactances that it passes as it is moved through the circuit of FIG. 20 to the terminals 136 and 137 at the right side thereof.

Thus, for example, as the impedance inverter 122 moves past the tuned circuit comprising inductor $L_1$ and capacitor 133 there is created the series inductor-capacitor arrangement 125 shown in FIG. 26. Similarly as the impedance inverter 122 passes the series inductor $L_{12}$ of FIG. 20, said $L_{12}$ is converted to the parallel capacitor $C_{12}$ of FIG. 26. As other examples, the tuned circuit 124 of FIG. 25 is converted to the series circuit 126 of FIG. 26 and inductor $L_{23}$ of FIG. 25 is converted to the parallel capacitor $C_{23}$ of FIG. 26.

When the impedance inverter circuit of FIG. 25 reaches the right-hand terminals 136 and 137, it is in essence a short circuit since it is the equivalent of a ¼-wave transmission line. Consequently, it, the impedance inverter circuit, can be eliminated entirely from the circuit simply by connecting together the output terminals 136 and 137. Such output terminals are, of course, not needed in the circuit anyway because circuit represents a single driving point impedance, i.e., the monolithic structure of FIG. 23 and only requires the input terminals 138 and 139 of FIG. 25 or FIG. 26, or any of the following FIGS. 27, 28, or 29.

The circuit of FIG. 26 can, by well-known principles, be transformed to that of FIG. 27 which, in turn, can be transformed into the device of FIG. 23, also by known principles. The reason for transforming the circuit of FIG. 24 into the circuit of FIG. 28 when both of these circuits are equivalent circuits of the physical monolithic crystal structure with the single driving point impedance mode of operation is as follows. It is not feasible to describe the operation of the monolithic lattice filter in terms of the circuit of FIG. 28 directly. It is, however, relatively easy to describe the lattice arms in terms of the structure of FIG. 24 directly. More specifically, the various components of the circuit of FIG. 24 such as $L_1$, $C_1$, $L_{12}$, etc. can be translated fairly directly into physical parameters of the monolithic crystal lattice arm structure, such as size and thickness of the plated areas, spacing between the plated areas, thickness of the crystal plate, and other parameters. Therefore, it is quite desirable and almost necessary to design the monolithic crystal filter from an electrical circuit similar to the one shown in FIG. 24.

On the other hand, however, there is not nearly as much available information on how to design lattice filters having particular frequency response characteristics from the circuit of FIG. 24 as there is from the circuit of FIG. 28. Consequently, one approach to designing lattice-type filters employing monolithic crystal impedances is to first design the filter in terms of the electrical component values of the circuit of FIG. 28. The next step is to transform the circuit of FIG. 28 back into the circuit of FIG. 24. Then from the circuit of FIG. 24, the actual physical monolithic crystal impedance structure can be designed.

In practice it frequently is not necessary to actually calculate the element values of the circuit of FIG. 28. Often, there are computer programs adapted to calculate the poles and zeros (i.e., the coefficients of the polynominals that describe the circuit of FIG. 28). These polynominals (poles and zeros) can then be employed to synthesize the configuration of the circuit of FIG. 24. Once the parameters of FIG. 24 are determined, other available computer programs can be employed to design the physical monolithic crystal structures which will be the physical equivalent of the circuit of FIG. 24.

V. SPECIAL CASE OF LATTICE FILTER WHEREIN THE TWO SERIES ARM IMPEDANCES AND THE TWO CROSSARM IMPEDANCES EACH USE A COMMON MONOLITHIC CRYSTAL IMPEDANCE

Reference is again made to the structure of FIG. 23 wherein is shown a monolithic crystal impedance which has two pairs of input terminals and which can function as both of the series arm impedances or alternatively, as both of the shunt arm impedances of the lattice filter network. In FIG. 23, the single monolithic crystal filter structure 114 forms both of the two series arm impedances $Z_A$.

An equivalent circuit can easily be devised for the structure of FIG. 23 which will show the single monolithic crystal structure 114 in terms of an equivalent circuit having the same general topology as that of FIG. 12 except that where the coupling in FIG. 12 is shown to be inductive between the two inputs, it would, in the case of the crystal structure, be primarily capacitive. A further difference is that the equivalent circuit within the block 78 of FIG. 12 would be altered to more closely coincide with the circuit of FIG. 26, which represents the equivalent circuit of a single monolithic crystal impedance.

Then by well-known circuit transformation techniques, a resultant circuit of the form shown in FIG. 16 can be obtained, with a difference in that the inductors $L_{em1}$, $L_{e1}$ and $L_e$ will be absent, and in their place will be capacitance values representing various types of capacitive coupling between the four input electrodes of the monolithic crystal.

VI. LATTICE-TYPE DELAY EQUALIZER EMPLOYING MONOLITHIC CRYSTAL IMPEDANCES

Most of the prior discussion relating to delay equalizers employing a disc-wire impedance structure is directly pertinent to delay equalizers employing a monolithic crystal impedance structure.

More specifically, the circuits of FIG. 17, 18, 19, 20, and 21 are also applicable to a delay equalizer employing a monolithic crystal impedance. The type of lattice network employed in the delay equalizer has a constant attenuation over a broad passband, but with the poles and zeros positioned in such a way as to provide phase delay at selected frequencies so that the group delay characteristic of the equalizer is substantially compensatory (the mirror image) with respect to the group delay of a filter having a more conventional frequency response characteristic, as described in connection with FIGS. 17 through 21 re the disc-wire equalizer.

It is apparent that instead of employing disc-wire impedance structures for $Z_A$ and $Z_B$ in the circuits of FIGS. 17 through 20, a monolithic crystal filter structure can be employed, having an equivalent circuit such as shown in FIGS. 24 through 26.

As in the case of the disc-wire impedances, the monolithic crystal structure in the delay equalizer has a plurality of poles and zeros in each of the reactive arm impedances of the circuit. For example, in FIG. 19 the two $Z_A$'s would comprise a monolithic crystal impedance having a plurality of poles and zeros arrangeable to produce an overall group delay characteristic as shown by waveform 141 of FIG. 21, which is compensatory to the group delay curve 140 of a conventional filter.

If a hybrid form of the delay equalizer, having the equivalent circuit shown in FIG. 20 is employed, the $Z_A$ therein will comprise a single monolithic crystal having a plurality of poles and zeros arrangeable so that the overall group delay characteristic is substantially as represented by curve 141 in FIG. 21, or a curve similar thereto depending upon the particular application desired.

It is to be noted that the forms of the invention shown and described herein are but preferred embodiments thereof and that various changes may be made in circuit design and circuit arrangement and in the physical parameters of the mechanical resonators without departing from the spirit or scope of the invention.

We claim:

1. A lattice derived impedance network for coupling a signal source means to a load means and comprising a plurality of impedance means including at least one nonresistive impedance means and in which each nonresistive impedance means comprises a mechanical resonating means having a plurality of poles and zeros positionable with respect to frequency to provide a passband having predetermined characteristics each nonresistive impedance means comprising:
 a plurality of discs positioned in a stacklike arrangement with their axes lying along a common line and spaced apart;
 a plurality of coupling wires positioned along the perimeters of said discs and secured thereto to hold said discs in said stacklike arrangement; and transducer means at one end of said plurality of discs for converting electrical energy to mechanical energy and for supplying said mechanical energy to an end disc of said stack of discs, and for converting the mechanical energy in said stack of discs back into electrical energy.

2. A lattice derived impedance network for coupling a signal source means to a load means and comprising a plurality of impedance means including at least one nonresistive impedance means and in which each nonresistive impedance means comprises a mechanical resonating means having a plurality of poles and zeros positionable with respect to frequency to provide a passband having predetermined characteristics, each nonresistive impedance means comprising:

a monolithic crystal plate having a plurality of pairs of electrodes of conductive material formed thereon; each of said pairs of electrodes comprising coatings of conductive material on substantially coinciding portions of opposite sides of said crystal plate; said pairs of electrodes being spaced apart one from the other a distance to provide substantial electrical isolation therebetween but close enough together to provide for transfer of mechanical vibrations from the crystal plate section between one pair of electrodes to the crystal plate section between an adjacent pair of electrodes; and pair of input terminals connected to a first pair of said electrodes for supplying electrical energy to said monolithic crystal plate and converting mechanical energy in said crystal plate back into electrical energy.

3. A lattice derived impedance network for coupling a signal source means to a load means and comprising a plurality of impedance means including at least one nonresistive impedance means and in which each nonresistive impedance means comprises a mechanical resonating means having a plurality of poles and zeros positionable with respect to frequency to provide a passband having predetermined characteristics first and second ones of said impedance means each comprise first and second input terminals, and further comprising:

common load resistance means coupling the first terminals of said first and second impedance means to a given potential; and transformer means for coupling said signal source means to said first and second impedance means and comprising a secondary winding means center tapped to said given potential and connected across said second terminals of said first and second impedance means.

4. A lattice derived impedance network in accordance with claim 3 in which each nonresistive impedance means comprises:

a plurality of discs positioned in a stacklike arrangement with their axes lying along a common line and spaced apart;

a plurality of coupling wires positioned along the perimeters of said discs and secured thereto to hold said discs in said stacklike arrangement; and transducer means at one end of said plurality of discs for converting electrical energy to mechanical energy and for supplying said mechanical energy to an end disc of said stack of discs, and for converting the mechanical energy in said stack of discs back into electrical energy.

5. A lattice derived impedance network in accordance with claim 3 in which each nonresistive impedance means comprises:

a monolithic crystal plate having a plurality of pairs of electrodes of conductive material formed thereon; each of said pairs of electrodes comprising coatings of conductive material on substantially coinciding portions of opposite sides of said crystal plate; said pairs of electrodes being spaced apart one from the other a distance to provide substantial electrical isolation therebetween but close enough together to provide for transfer of mechanical vibrations from the crystal plate section between one pair of electrodes to the crystal plate section between an adjacent pair of electrodes; and input means comprising said first and second input terminals connected to a first pair of said electrodes on said crystal plate for supplying electrical energy to said monolithic crystal plate and converting mechanical energy in said crystal plate back into electrical energy.

6. A lattice derived impedance network for coupling a signal source means to a load means and comprising a plurality of impedance means including at least one nonresistive impedance means and in which each nonresistive impedance means comprises a mechanical resonating means having a plurality of poles and zeros positionable with respect to frequency to provide a passband having predetermined characteristics, one of said nonresistive impedance means comprising first and second input terminals, and further comprising:

first resistive means having first and second input terminals;

common load resistor means coupling said first input terminals to a given potential; and transformer means for coupling said signal source means to said nonresistive impedance means and to said first resistive means and comprising a secondary winding means center tapped to said given potential and connected across said second terminals of said nonresistive impedance means and said first resistive means.

7. A lattice derived impedance network in accordance with claim 6 in which said nonresistive impedance means comprises:

a plurality of discs positioned in a stacklike arrangement with their axes lying along a common line and spaced apart;

a plurality of coupling wires positioned along the perimeters of said discs and secured thereto to hold said discs in said stacklike arrangement; and transducer means at one end of said plurality of discs for converting electrical energy to mechanical energy and for supplying said mechanical energy to an end disc of said stack of discs, and for converting the mechanical energy in said stack of discs back into electrical energy.

8. A lattice derived impedance network in accordance with claim 7 in which said nonresistive impedance means comprises:

a monolithic crystal plate having a plurality of pairs of electrodes of conductive material formed thereon; each of said pairs of electrodes comprising coatings of conductive material on substantially coinciding portions of opposite sides of said crystal plate; said pairs of electrodes being spaced apart one from the other a distance to provide substantial electrical isolation therebetween but close enough together to provide for transfer of mechanical vibrations from the crystal plate section between one pair of electrodes to the crystal plate section between an adjacent pair of electrodes; and input means comprising said first and second input terminals connected to a first pair of said electrodes on said crystal plate for supplying electrical energy to said monolithic crystal plate and converting mechanical energy in said crystal plate back into electrical energy.

9. A lattice derived impedance network comprising two series arm and two crossarm impedances, each of said impedances comprising a mechanical resonating means having a plurality of poles and zeros arrangeable with respect to frequency to provide predetermined passband characteristics, each impedance comprising:

a plurality of discs positioned in a stacklike arrangement with their axes lying along a common line and spaced apart;

a plurality of coupling wires positioned along the perimeters of said discs and secured thereto to hold said discs in said stacklike arrangement; and transducer means at one end of said plurality of discs for converting electrical energy to mechanical energy and for supplying said mechanical energy to an end disc of said stack of discs, and for converting the mechanical energy in said stack of discs back into electrical energy.

10. A lattice derived impedance network comprising two series arm and two crossarm impedances, each of said impedances comprising a mechanical resonating means having a plurality of poles and zeros arrangeable with respect to frequency to provide predetermined passband characteristics, each impedance comprising:
- a monolithic crystal plate having a plurality of pairs of electrodes of conductive material formed thereon; each of said pairs of electrodes comprising coatings of conductive material on substantially coinciding portions of opposite sides of said crystal plate; said pairs of electrodes being spaced apart a distance to provide substantial electrical isolation therebetween but close enough together to provide for transfer of mechanical vibrations from the crystal plate section between one pair of electrodes to the crystal plate section between an adjacent pair of electrodes; and
- a pair of input terminals connected to a first pair of said electrodes for supplying electrical energy to said monolithic crystal plate and converting mechanical energy in said crystal plate back into electrical energy.

11. A lattice-type network comprising two series arm and two crossarm impedances, each of said impedances comprising a mechanical resonating means having a plurality of poles and zeros arrangeable with respect to frequency to provide predetermined passband characteristics, first one of said mechanical resonating means comprising said two series arm impedances and a second one of said mechanical resonating means comprising said two crossarm impedances:
- said first mechanical resonating means comprising a first pair of first and second input means, each of said first and second input means comprising the input means for an individual one of the two series arm impedances; and
- said second mechanical resonating means comprising a second pair of third and fourth input means, each of said third and fourth input means comprising the input means for an individual one of said two crossarm impedances.

12. A lattice-type network in accordance with claim 11 in which each of said first and second mechanical resonating means comprises:
- a monolithic crystal plate having a plurality of pairs of electrodes of conductive material formed thereon; each of said pairs of electrodes comprising coatings of conductive material on substantially coinciding portions of opposite sides of said crystal plate; said pairs of electrodes being spaced apart a distance to provide substantial electrical isolation therebetween but close enough together to provide for transfer of mechanical vibrations from the crystal plate section between one pair of electrodes to the crystal plate section between an adjacent pair of electrodes; and
- in which a first and a second pair of electrodes comprise one of said pairs of input means for supplying electrical energy to said monolithic crystal plate and converting mechanical energy in said crystal plate back into electrical energy.

13. A lattice-type network in accordance with claim 11 in which each of said first and second mechanical resonating means comprises:
- a plurality of discs positioned in a stacklike arrangement with their axes lying along a common line and spaced apart;
- a plurality of coupling wires positioned along the perimeters of said discs and secured thereto to hold said discs in said stacklike arrangement; and
- transducer means at one end of said plurality of discs comprising one of said pairs of input means and constructed to convert electrical energy to mechanical energy, to supply said mechanical energy to an end disc of said stack of discs, and to convert the mechanical energy in said stack of discs back into electrical energy.

UNITED STATES PATENT OFFICE
CERTIFICATE OF CORRECTION

Patent No. 3,573,671            Dated April 6, 1971

Inventor(s) Robert A. Johnson et al.

It is certified that error appears in the above-identified patent and that said Letters Patent are hereby corrected as shown below:

Column 2, line 54, after "thereby;" insert -- Fig. 12 shows an equivalent circuit for the structure of Fig. 11. -- Column 7, line 41, "$\frac{L_{el-s}}{2}$" should read -- $\frac{L_{el's}}{2}$ --; line 42, "$z_{b1}$" should read -- $Z_{b1}$ --; lines 45 and 48, "$z_{B1}$" each occurrence, should read -- $Z_{B1}$ --; line 64, "$z_{B2}$" should read -- $Z_{B2}$ --; lines 64 and 69, "$z_{A2}$", each occurrence, should read -- $Z_{A2}$ --; line 69, "$z_{B2}$" should read -- $Z_{B2}$ --; line 7 "$z_{A1}$" should read -- $Z_{A1}$ --; lines 71 and 73, "$z_{B1}$", each occurrence, should read -- $Z_{B1}$ --. Column 9, line 2, "Z" sho read -- $Z_A$ --. Column 13, line 26, before "pair", first occurrence, insert -- a --.

Signed and sealed this 7th day of September 1971.

(SEAL)
Attest:

EDWARD M. FLETCHER, JR.
Attesting Officer

ROBERT GOTTSCHALK
Acting Commissioner of Pat